(12) United States Patent
Shi et al.

(10) Patent No.: US 12,528,341 B2
(45) Date of Patent: Jan. 20, 2026

(54) MULTI-LAYER HARDTOP STRUCTURE, COVER ASSEMBLY, END SUPPORT MECHANISM, AND POSITIONING MECHANISM FOR TRUCK BED

(71) Applicant: CHANGZHOU SUNWOOD INTERNATIONAL TRADING CO., LTD., Changzhou (CN)

(72) Inventors: Hang Shi, Changzhou (CN); Hongjuan Zheng, Changzhou (CN)

(73) Assignee: CHANGZHOU SUNWOOD INTERNATIONAL TRADING CO., LTD., Changzhou (CN)

(*) Notice: Subject to any disclaimer, the term of this patent is extended or adjusted under 35 U.S.C. 154(b) by 360 days.

(21) Appl. No.: 18/202,969

(22) Filed: May 29, 2023

(65) Prior Publication Data

US 2024/0326568 A1   Oct. 3, 2024

(30) Foreign Application Priority Data

Mar. 29, 2023   (CN) .......................... 202320665182.9

(51) Int. Cl.
*B60J 7/14* (2006.01)
*B32B 3/16* (2006.01)
(Continued)

(52) U.S. Cl.
CPC ................ *B60J 7/141* (2013.01); *B32B 3/16* (2013.01); *B32B 3/30* (2013.01); *B32B 7/08* (2013.01);
(Continued)

(58) Field of Classification Search
CPC .. B60J 7/141; B60J 7/198; B32B 3/16; B32B 3/30; B32B 7/08; B32B 2605/08
(Continued)

(56) References Cited

U.S. PATENT DOCUMENTS 6,113,176 A     9/2000  Bernardo
8,672,388 B2 *  3/2014  Rusher ..................... B60P 7/04
                                                      296/100.09
(Continued)

FOREIGN PATENT DOCUMENTS

CN   107284205 A  * 10/2017  .............. B60J 7/141
CN   111688455 A  *  9/2020  .............. B60J 7/185
(Continued)

*Primary Examiner* — Hilary L Gutman
(74) *Attorney, Agent, or Firm* — Bayramoglu Law Offices LLC

(57) ABSTRACT

A multi-layer hardtop structure includes a lower assembly, an upper assembly, and a soft layer, where the lower assembly includes multiple lower slat units, and the upper assembly includes multiple upper slat units; the upper slat unit is connected to the lower slat unit to form a rotation unit, or the lower slat unit alone forms a rotation unit; and the soft layer continuously covers the lower assembly, and is partially limited between the lower slat unit and the upper slat unit. In the multi-layer hardtop structure, the upper slat unit is connected to the lower slat unit, and the soft layer is provided between the upper slat unit and the lower slat unit. Therefore, the multi-layer hardtop structure has a desired waterproof effect and increases the load-bearing capacity of the entire hardtop.

17 Claims, 6 Drawing Sheets

(51) Int. Cl.
  *B32B 3/30* (2006.01)
  *B32B 7/08* (2019.01)
  *B60J 7/00* (2006.01)
  *B60J 7/19* (2006.01)
(52) U.S. Cl.
  CPC .............. *B60J 7/0084* (2013.01); *B60J 7/198* (2013.01); *B32B 2605/08* (2013.01)
(58) Field of Classification Search
  USPC .......................................................... 296/98
  See application file for complete search history.

(56) References Cited

U.S. PATENT DOCUMENTS

| | | | |
|---|---|---|---|
| 11,292,324 B2* | 4/2022 | Schmeichel | B60J 7/141 |
| 11,654,830 B2* | 5/2023 | Salewski | B60R 5/045 |
| | | | 296/24.4 |
| 12,024,003 B1* | 7/2024 | Weng | B60J 7/141 |
| 2010/0019528 A1* | 1/2010 | Hu | B60P 7/0876 |
| | | | 296/100.01 |
| 2013/0106133 A1* | 5/2013 | Maimin | B60J 7/1856 |
| | | | 296/100.09 |
| 2017/0008382 A1* | 1/2017 | Bernardo | B60J 7/041 |
| 2018/0118004 A1* | 5/2018 | Schmeichel | B60J 7/141 |
| 2019/0100087 A1* | 4/2019 | Facchinello | B60J 7/141 |
| 2020/0171928 A1* | 6/2020 | Rawnsley | B60J 7/067 |
| 2020/0331329 A1* | 10/2020 | Schmeichel | B60J 7/141 |
| 2021/0037997 A1 | 2/2021 | Hocking | |
| 2022/0219516 A1* | 7/2022 | Schmeichel | B60J 7/141 |

FOREIGN PATENT DOCUMENTS

| | | | | |
|---|---|---|---|---|
| CN | 115042603 A | * | 9/2022 | ............ B60J 10/90 |
| CN | 115534641 A | * | 12/2022 | ............ B60J 7/141 |
| CN | 112265436 B | * | 9/2024 | ............ B60J 7/198 |
| JP | 2000052868 A | * | 2/2000 | ............ B60R 5/045 |

* cited by examiner

MULTI-LAYER HARDTOP STRUCTURE, COVER ASSEMBLY, END SUPPORT MECHANISM, AND POSITIONING MECHANISM FOR TRUCK BED

CROSS REFERENCE TO THE RELATED APPLICATIONS

This application is based upon and claims priority to Chinese Patent Application No. 202320665182.9, filed on Mar. 29, 2023.

TECHNICAL FIELD

The present invention relates to the technical field of truck bed covers, and in particular to a multi-layer hardtop structure, a cover assembly, an end support mechanism, and a positioning mechanism for a truck bed.

BACKGROUND

In the prior art, some truck beds use a rollaway hard top with a continuous waterproof layer. For example, some prior art provides a truck bed cover, including slats that are covered by leather, and the slats are bonded with the leather by adhesive (except for a position of a hinge), resulting in a large bonding area and high adhesive cost. In the case of a rollup assembly covering the truck bed, the rollup assembly is exposed to the sun, wing, rain and the like, the leather is bent during rolling up. After long-term use, the leather is prone to bulging and even detaching from the slats in a large area, thereby resulting in waterproof failure.

In the prior art, the rollup assembly is typically only rotated through the hinge between the slats, and there is no additional connection limit provided, resulting in unstable movement.

Also, there is a movement gap between each two adjacent slats. When the rollup assembly is unrolled, the movement gaps are uneven, and it is inconvenient to make the rollup assembly in place.

SUMMARY

In order to solve the problem of waterproof failure caused by the detaching of the leather bonded to the rollup assembly of the truck bed cover after long-term use in the prior art, the present invention provides a multi-layer hardtop structure and a cover assembly for a truck bed. The present invention limits a soft layer through a connector to prevent overall detachment of the soft layer.

In order to solve the problem of unstable movement of the slats due to the lack of additional limit in the prior art, the present invention provides an end support mechanism for a hard top of a truck bed with an additional limit function.

In order to solve the problem of inaccurate overall positioning of the rollup assembly when the rollup assembly is unrolled in the prior art, the present invention provides a positioning mechanism for a hard top of a truck bed, which achieves overall positioning of the rollup assembly.

In order to solve the above technical problems, the present invention adopts the following technical solutions.

The multi-layer hardtop structure for a truck bed includes:
a lower assembly, including multiple lower slat units;
an upper assembly, including multiple upper slat units, where the upper slat units are connected to the lower slat units; and a soft layer, continuously covering the lower assembly, and partially limited between the lower slat unit and the upper slat unit; and
where, the upper slat unit is correspondingly connected to the lower slat unit to form a rotation unit, or the lower slat unit alone forms a rotation unit; and each two adjacent rotation units are rotatable with each other.

Further, the upper slat unit is connected one-to-one with the lower slat unit.

Further, the upper slat unit is clamped with the lower slat unit.

Further, the lower slat unit is provided with a recessed part, and the upper slat unit is provided with a protruding part extending into the recessed part: the protruding part is provided with a clamp slot, and the recessed part is provided with a clamp buckle; and the clamp buckle and the clamp slot are separated by the soft layer, and are matched with each other.

Further, the upper slat unit is provided with a top plate on at least one side of the recessed part, and the lower slat unit is provided with a support plate corresponding to the top plate; and when the clamp buckle and the clamp slot are matched, the soft layer is sandwiched between the top plate and the support plate.

Further, a fastening element is provided between at least two of the lower slat unit, the soft layer, and the upper slat unit.

Further, each two adjacent lower slat units or each two adjacent upper slat units are connected through a limit assembly: the limit assembly includes a first limit part and a second limit part: the first limit part is provided with a limit groove, and the second limit part is provided with a limit protrusion: when the lower slat units or the upper slat units are unrolled, the limit protrusion is inserted into the limit groove to prevent the two adjacent lower slat units or the two upper slat units from moving up and down: the first limit part is provided with a first limit part, and the second limit part is provided with a second limit part; and when each two adjacent lower slat units or each two upper slat units are rotated with each other for a set angle, the second limit part and the first limit part are abutted against each other to limit further relative rotation of the two adjacent lower slat units or the two upper slat units.

The present invention further relates to a cover assembly for a hard top of a truck bed. The cover assembly includes the multi-layer hardtop structure, and further includes a side railing, where the side railing is fixed to the truck bed through a fixture: the side railing is provided with a drain channel: the side railing is further provided with multiple drain holes located above and communicated with the drain channel: the side railing is further provided with a lock structure matched with the lower assembly; and the lock structure is matched with an end of the lower assembly close to a rear part of the truck bed.

The present invention further relates to an end support mechanism for a rollaway top of a truck bed. The end support mechanism includes:
a lower assembly, including multiple lower slat units;
a soft layer, continuously covering the lower assembly, and connected to the lower assembly through a connector; and
end support parts, where each of the end support parts is integrated or fixedly connected to an end of the lower slat unit or the connector, and each two adjacent end support parts are rotatably connected.

Further, the end support parts each include one end provided with a rotating part and the other end provided with an open groove; and the rotating part of each of the end support parts is provided in, and rotatable relative to the open groove of an adjacent end support part.

Further, the open groove is provided with a limit end; and when the lower assembly is unrolled, the limit end is abutted against the adjacent end support part to limit a folding direction of the lower slat unit.

The present invention further relates to a positioning mechanism for a hard top of a truck bed. The positioning mechanism includes the multi-layer hardtop structure, and further includes:
  a side railing, fixed to the truck bed, and supporting the lower assembly thereon; and
  where, the positioning mechanism is provided between the lower slat unit, an extension member at an end of the lower slat unit, or an extension member at an end of the upper slat unit and the side railing.

Further, the positioning mechanism includes a quick fastener provided between the lower slat unit, the extension member at the end of the lower slat unit, or the extension member at the end of the upper slat unit and the side railing.

The present invention has the following beneficial effects:
  (1) In the multi-layer hardtop structure of the present invention, the upper slat unit is connected to the lower slat unit, and the soft layer is provided between the upper slat unit and the lower slat unit. The design can limit the soft layer and prevent it from detaching from the lower slat unit in a large area after long-term use. Therefore, the multi-layer hardtop structure of the present invention has a desired waterproof effect and increases the load-bearing capacity of the entire hardtop.
  (2) In the limit assembly, the limit protrusion and the limit groove are matched to prevent the lower slat unit or the upper slat unit from moving up and down, ensuring stable unrolling. In addition, the first limit part and the second limit part are matched to limit the rotation angle and facilitate rolling up.
  (3) In the cover assembly of the present invention, the side railing supports the multi-layer hardtop structure, and is provided with the drain channel and the drain holes to achieve a drainage purposes.
  (4) In the present invention, the end support part is provided at the end of the lower slat unit or the upper slat unit. In this way, the rotation of the cover plate is limited to achieve stable movement. In addition, for each two adjacent end support parts, the rotating part and the limit end are matched to limit the rotation direction of the cover plate, facilitating the rolling up of the lower slat unit and facilitating operation.
  (5) The lower slat unit, the extension member at the end of the lower slat unit, or the extension member at the end of the upper slat unit is connected to the side railing through a quick positioning mechanism such as a quick fastener. The design ensures the positioning of the lower slat unit and avoids horizontal displacement of the lower slat unit. When the lower slat unit is unrolled, it is positioned through the quick positioning mechanism. After the unrolling, the lock structure can be connected to the lower assembly without adjusting the position of the lower slat unit, simplifying the operation.

BRIEF DESCRIPTION OF THE DRAWINGS

To describe the technical solutions in the embodiments of the present invention more clearly, the following briefly introduces the drawings required for describing the embodiments. Apparently, the drawings in the following description show merely some embodiments of the present invention, and those of ordinary skill in the art may still derive other drawings from these drawings without creative efforts.

Figure 1:
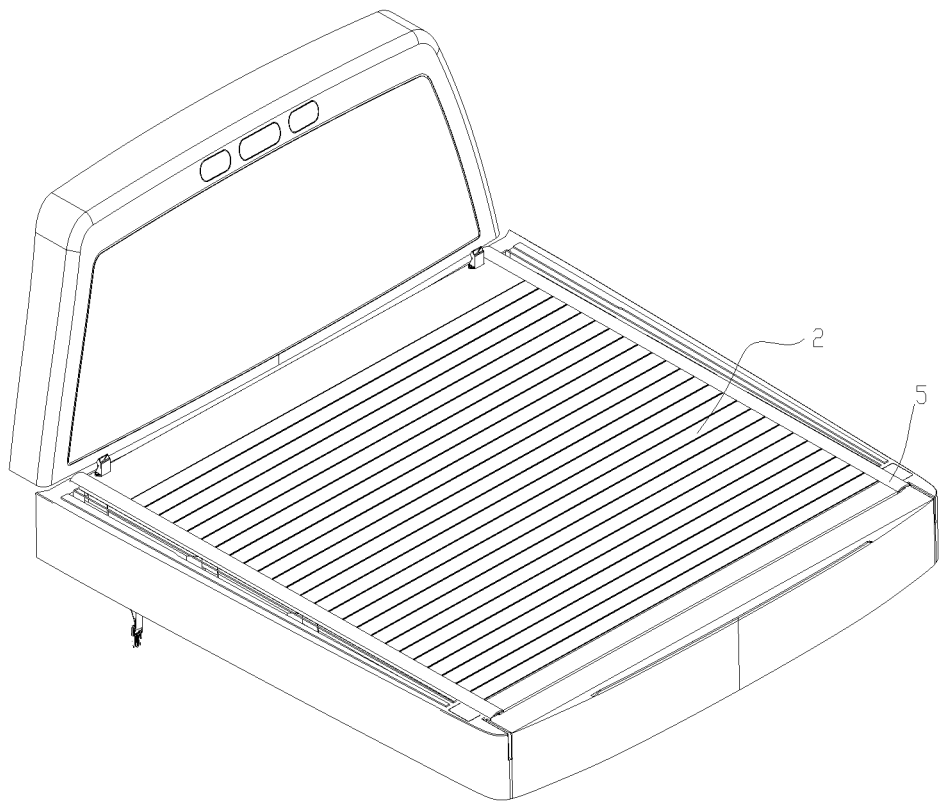
FIG. 1 is a three-dimensional view of a multi-layer hardtop structure, in an unrolled state, for a truck bed according to the present invention.

REFERENCE NUMERALS 1. lower slat unit; 1-1. cover plate; 1-11. recessed part; 1-12. clamp buckle; 1-13. support plate; 1-14. limit groove; 1-15. limit protrusion; 1-16. first limit part: 1-17. second limit part; 1-2. end support part; 1-21. rotating part; 1-22. open groove; 1-23. limit end; 2. upper slat unit; 2-1. protruding part; 2-2. clamp slot; 2-3. top plate; 3. soft layer; 4. side railing; 4-1. drain channel; 4-2. drain hole; 5. waterproof cover strip; 6. fixture; 7. lock structure; and 8. quick fastener.

DETAILED DESCRIPTION OF THE EMBODIMENTS

The technical solutions in embodiments of the present invention will be described below clearly and completely with reference to the drawings in the embodiments of the present invention. Apparently, the described embodiments are merely a part, rather than all of the embodiments of the present invention. The following description of at least one exemplary embodiment is merely illustrative, and not intended to limit the present invention and application or use thereof in any way. All other embodiments obtained by those of ordinary skill in the art based on the embodiments of the present invention without creative efforts should fall within the protection scope of the present invention.

It should be noted that the terms used herein are merely used for describing the specific embodiments, but are not intended to limit the exemplary embodiments of the present disclosure. As used herein, the singular forms are intended to include the plural forms as well, unless the context clearly indicates otherwise, and also, it should be understood that when the terms "include" and/or "comprise" are used in this specification, they indicate that there are features, steps, operations, devices, elements, and/or combinations thereof.

The relative arrangement of the components and steps, the numerical expressions and numerical values set forth in these embodiments do not limit the scope of the present invention unless specifically stated otherwise. Meanwhile, it should be understood that for ease of description, each portion in the drawings is not necessarily drawn to the actual scale. The technologies, methods, and devices known to those of ordinary skill in the art may not be discussed in detail, but where appropriate, the technologies, methods, and devices should be regarded as part of the specification. In all examples shown and discussed herein, any specific value should be interpreted as merely exemplary, rather than restrictive. Therefore, other examples of the exemplary examples may have different values. It should be noted that similar reference signs and letters represent similar items in the drawings below. Therefore, once an item is defined in one drawing, it does not need to be further discussed in subsequent drawings.

It should be understood that in the description of the present invention, orientation terms such as "front", "rear", "upper", "lower", "left", "right", "transverse", "longitudinal", "vertical", "horizontal", "top" and "bottom" indicate orientation or position relationships based on the drawings. Unless otherwise specified, these orientation terms are merely intended to facilitate or simplify the description of the present invention, rather than to indicate or imply that the mentioned device or elements must have a specific orientation and must be constructed and operated in a specific orientation. Therefore, they should not be construed as a limitation to the protection scope of the present invention. The orientation terms "inner" and "outer" refer to the inner and outer parts relative to the contour of the mentioned component.

For ease of description, spatially relative terms, such as "above", "on the upper side of", "on the upper surface of" and "on", can be used to describe the spatial positional relationship between components or features shown in the figure. It should be understood that the spatially relative terms are intended to encompass different orientations of the components in use or operation in addition to those shown in the figure. For example, if a component in the figure is inverted, it is described as a component "above other component or structure" or "on other component or structure". Therefore, the component will be positioned as "below other component or structure" or "under other component or structure". Therefore, the exemplary term "above" may include both orientations "above" and "below". The component may also be positioned in other different ways (rotated by 90 degrees or in other orientations), but the relative description of the space should be explained accordingly.

In addition, it should be noted that the use of words such as "first" and "second" to define parts and components is only for the convenience of distinguishing corresponding parts and components. Unless otherwise stated, the above words have no special meaning, so they should not be construed as a limitation on the protection scope of the present invention.

Embodiment 1

Figure 2:
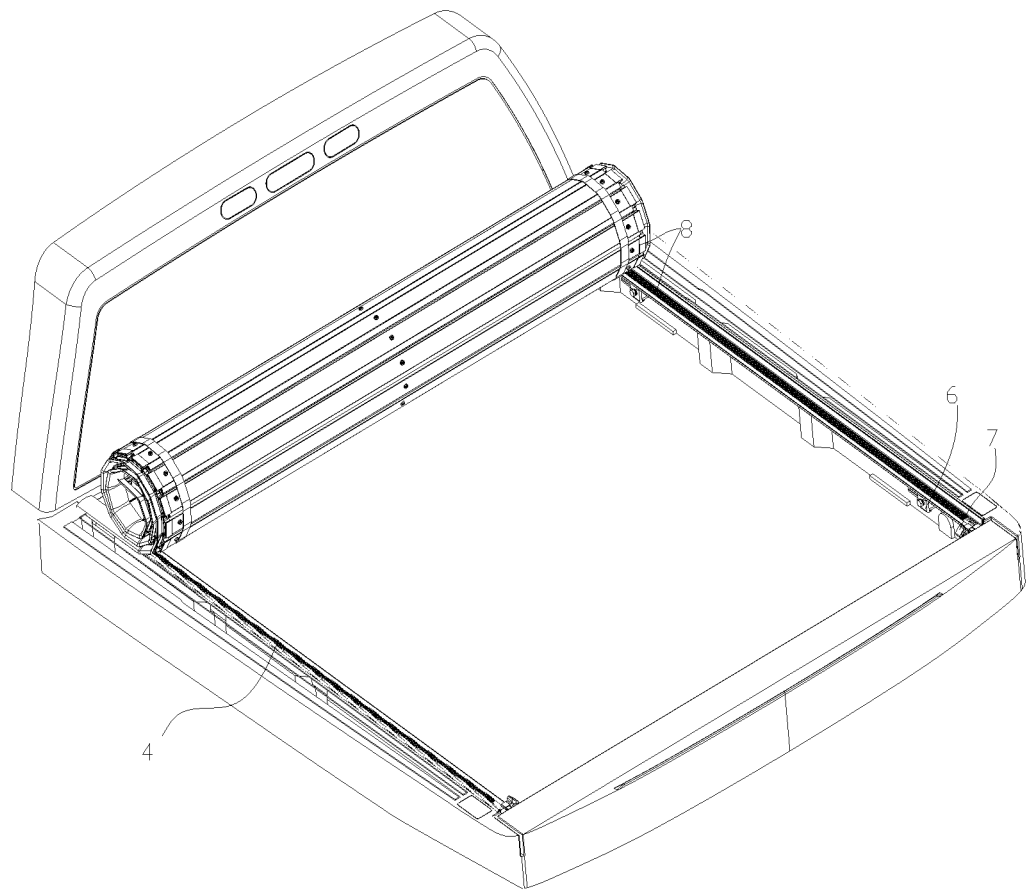
FIG. 2 is a three-dimensional view of the multi-layer hardtop structure, in a rolled state, for a truck bed according to the present invention.
Figure 3:
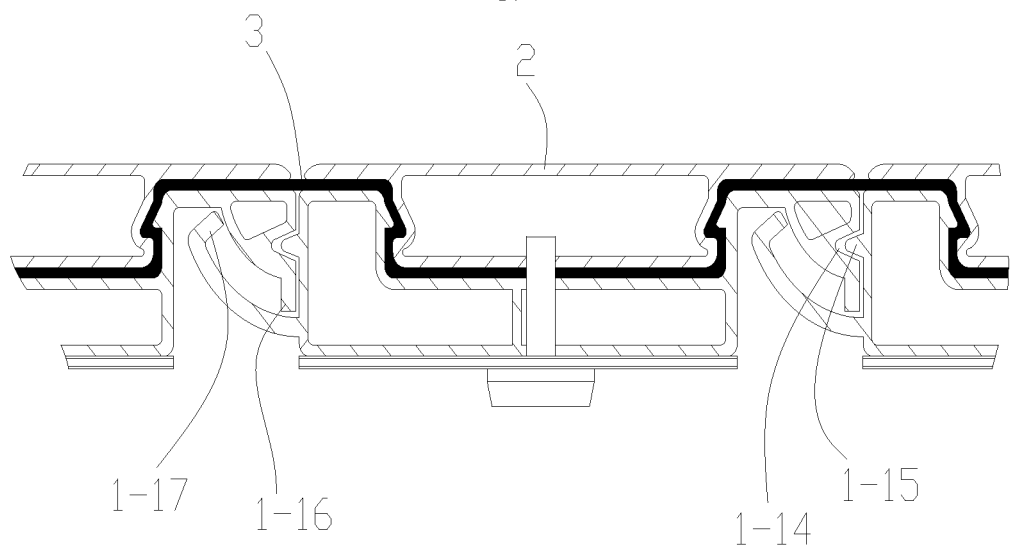
FIG. 3 is a cross-sectional view of the multi-layer hardtop structure.
Figure 4:
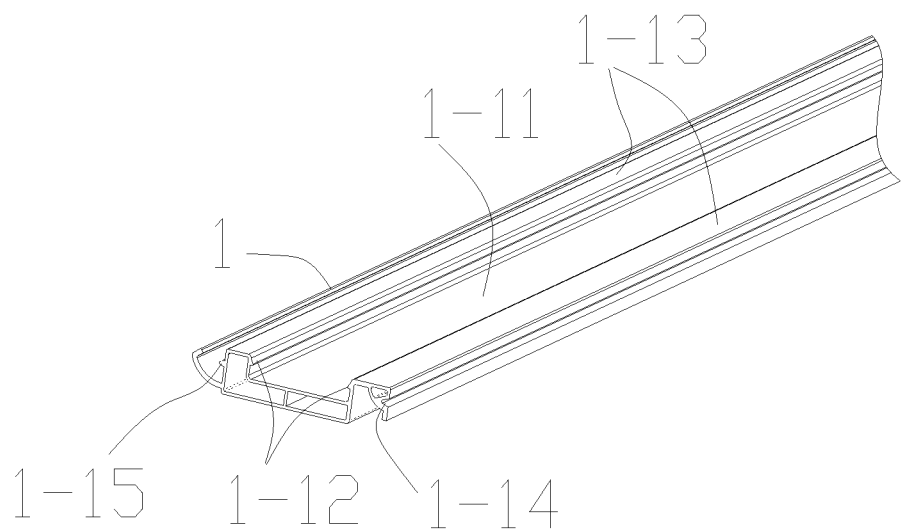
FIG. 4 is a structural diagram of a lower slat unit according to Embodiment 1.
Figure 5:
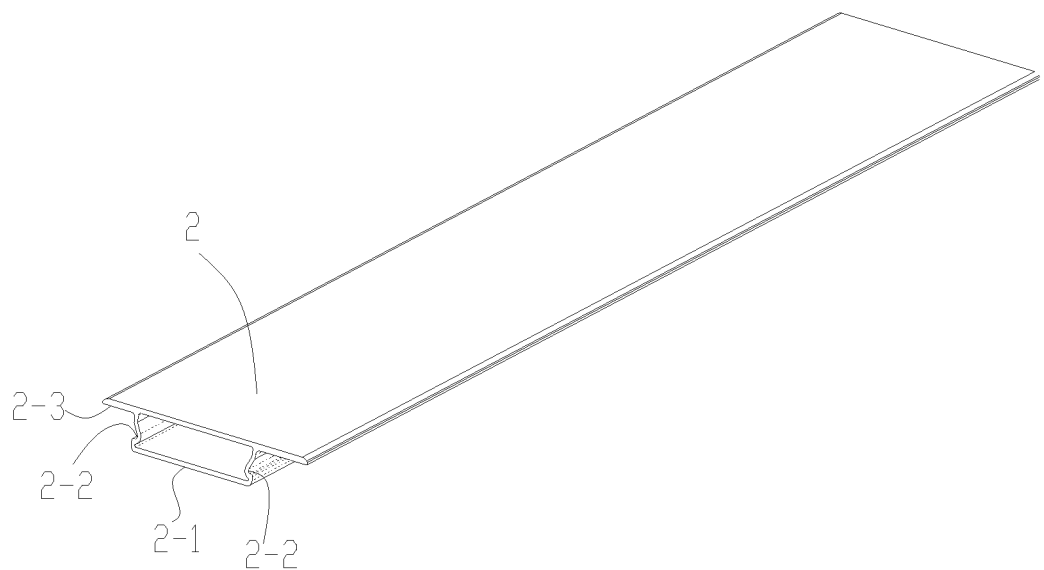
FIG. 5 is a structural diagram of an upper slat unit.

As shown in FIGS. 1 and 2, this embodiment provides a cover assembly for a hard top of a truck bed. The cover assembly includes a multi-layer hardtop structure. The hardtop structure includes a lower assembly, an upper assembly, and soft layer 3. The soft layer 3 has a waterproof function, and is made of a material, including but not limited to leather and rubber. The lower assembly includes multiple lower slat units 1. Each two adjacent lower slat units 1 are rotatably connected to each other. The upper assembly includes multiple upper slat units 2. The upper slat units 2 are connected to the lower slat units 1. The soft layer 3 continuously covers the lower assembly, and the soft layer 3 is partially limited between the lower slat unit 1 and the upper slat unit 2. The upper slat unit 2 and the lower slat unit 1 may not necessarily correspond one by one. For example, the upper slat unit 2 is adjacent to the lower slat unit 1. Preferably, the upper slat unit 2 is connected one-to-one with the lower slat unit 1. The upper slat unit 2 has a size roughly corresponding to that of the lower slat unit 1 along a width direction of the truck bed. The upper slat unit 2 is clamped with the lower slat unit 1. A clamp buckle can be directly provided on a panel of the upper slat unit 2 and a panel of the lower slat unit 1. However, due to the configuration of the soft layer 3 between the upper slat unit and the lower slat unit, if the clamp buckle is directly provided, the clamp buckle will not be reliable for connection and will generate a significant stress on the soft layer 3. Therefore, in order to facilitate the configuration of the clamp buckle and protect the soft layer 3, the lower slat unit 1 is provided with recessed part 1-11, and the upper slat unit 2 is provided with protruding part 2-1 extending into the recessed part 1-11. As shown in FIGS. 3 to 5, the protruding part 2-1 is provided with clamp slot 2-2, and the recessed part 1-11 is provided with clamp buckle 1-12. The clamp buckle 1-12 and the clamp slot 2-2 are separated by the soft layer 3, and are matched with each other. The protruding part 2-1 and the recessed part 1-11 provide a deep space to provide the clamp buckle and achieve a transition purpose, without causing a significant stress on the soft layer 3.

As shown in FIG. 3, the upper slat unit 2 is provided with top plate 2-3 on at least one side of the recessed part 1-11, and the lower slat unit 1 is provided with support plate 1-13 corresponding to the top plate 2-3. When the clamp buckle 1-12 and the clamp slot 2-2 are matched, the soft layer 3 is sandwiched between the top plate 2-3 and the support plate 1-13. In the present invention, the top plate 2-3 is provided on two sides of the recessed part 1-11. The top plate 2-3 extends to be close to a limit assembly of the lower slat unit 1. In this way, the upper slat unit 2 can achieve the purpose of clamping the soft layer 3 (with a limiting area similar to an adhesive area), thereby avoiding the need for additional adhesive. However, if the soft layer 3 is only clamped by the clamp buckle, the soft layer 3 may be displaced. Therefore, further, in order to prevent the displacement of the soft layer 3, a fastening element is provided between at least two of the lower slat unit 1, the soft layer 3, and the upper slat unit 2. The fastening element includes but is not limited to a threaded fastening element, such as a screw or a nut. The fastening element can be provided between the lower slat unit 1 and the soft layer 3, or between the upper slat unit 2 and the soft layer 3. The design can limit the soft layer 3 to prevent its displacement. Alternatively, the fastening element can run through the upper slat unit 2, the soft layer 3, and the lower slat unit 1. The design can limit the soft layer 3 and fix the upper slat unit 2. In addition, if the fastening element runs through the upper slat unit 2, the soft layer, and the lower slat unit, the upper slat unit 2 and the lower slat unit 1 are not limited to the connection form of the clamp buckle or the connection form of the protruding part 2-1 and the clamp slot 2-2. The upper slat unit 2 can be directly a flat plate. Alternatively, the protruding part 2-1 and the clamp slot 2-2 can be retained, but the clamp buckle 1-12 and the clamp slot 2-2 are omitted.

As shown in FIG. 3, each two adjacent lower slat units 1 are connected through the limit assembly. The limit assembly includes a first limit part provided at a first end of the lower slat unit 1 and a second limit part provided at a second end of the lower slat unit 1. The first limit part is provided with limit groove 1-14, and the second limit part is provided with limit protrusion 1-15. When the lower slat units 1 are unrolled, the limit protrusion 1-15 is inserted into the limit groove 1-14 to prevent each two adjacent lower slat units 1 from moving up and down. The first limit part is provided with first limit part 1-16, and the second limit part is provided with second limit part 1-17. A head of the first limit part 1-16 and a head of the second limit part 1-17 each are provided with a curved plate for guidance. When each two adjacent lower slat units 1 are rotated with each other for a set angle, the second limit part 1-17 and the first limit part 1-16 are abutted against each other to limit further relative rotation of the two adjacent lower slat units 1. The set angle includes 20° and 30° based on an actual rolling need.

Figure 6:
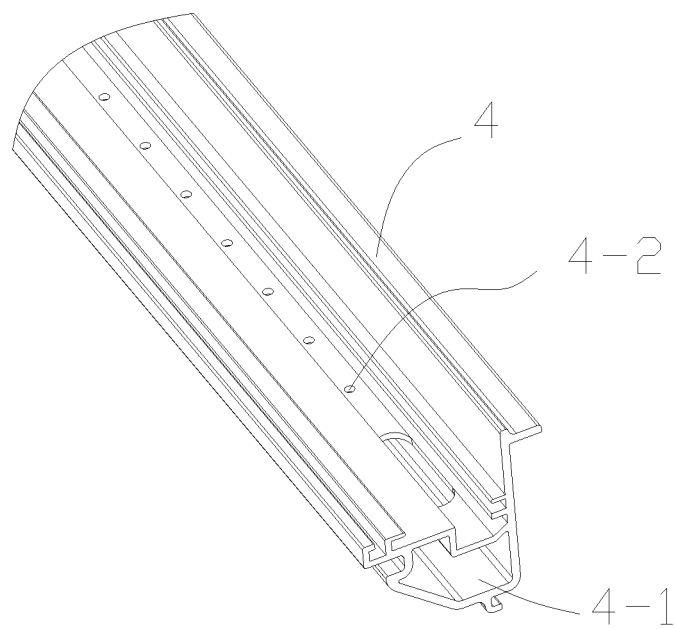
FIG. 6 is a structural diagram of a side railing.

The cover assembly further includes side railing 4. The side railing 4 is fixed to the truck bed through fixture 6. The lower assembly is supported on the side railing 4. The side railing 4 is provided with drain channel 4-1, as shown in FIG. 6. The side railing 4 is provided with multiple drain holes 4-2 located above and communicated with the drain channel 4-1. The side railing 4 is provided with a support surface for supporting the lower slat unit 1, an extension member of the lower slat unit 1, or an extension member of the upper slat unit 2. The drain holes 4-2 are lower than the support surface.

The fixture includes one end located on an edge of the truck bed and the other end located outside the drain channel 4-1. The lower slat unit 1 is further provided with a mounting groove. The mounting groove is provided therein with waterproof cover strip 5. The waterproof cover strip 5 can also be fixed by other means such as bonding. The waterproof cover strip 5 covers the side railing 4 or the truck bed. The side railing 4 is provided with lock structure 7 matched with the lower assembly. The lock structure 7 is matched with an end of the lower assembly close to a rear part of the truck bed. Specifically, the lower assembly is provided with a rear panel close to the rear part of the truck bed. The lock structure is provided on the rear panel. The lock structure can be provided on the side railing 4 in a structure similar to the fixture, with an adjustable position.

Embodiment 2

Figure 7:
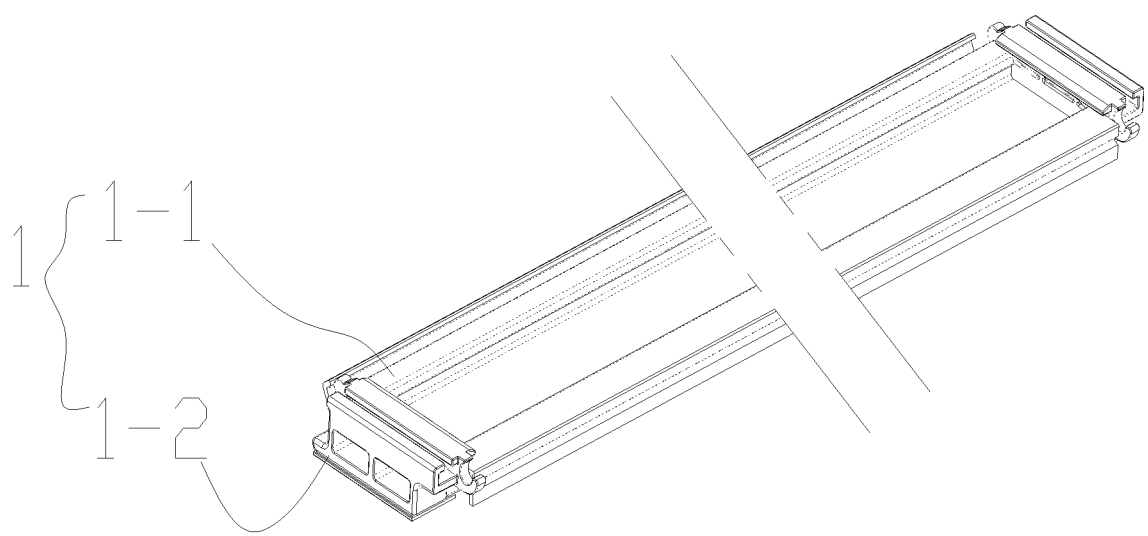
FIG. 7 is a structural diagram of a lower slat unit according to Embodiment 2.
Figure 8:
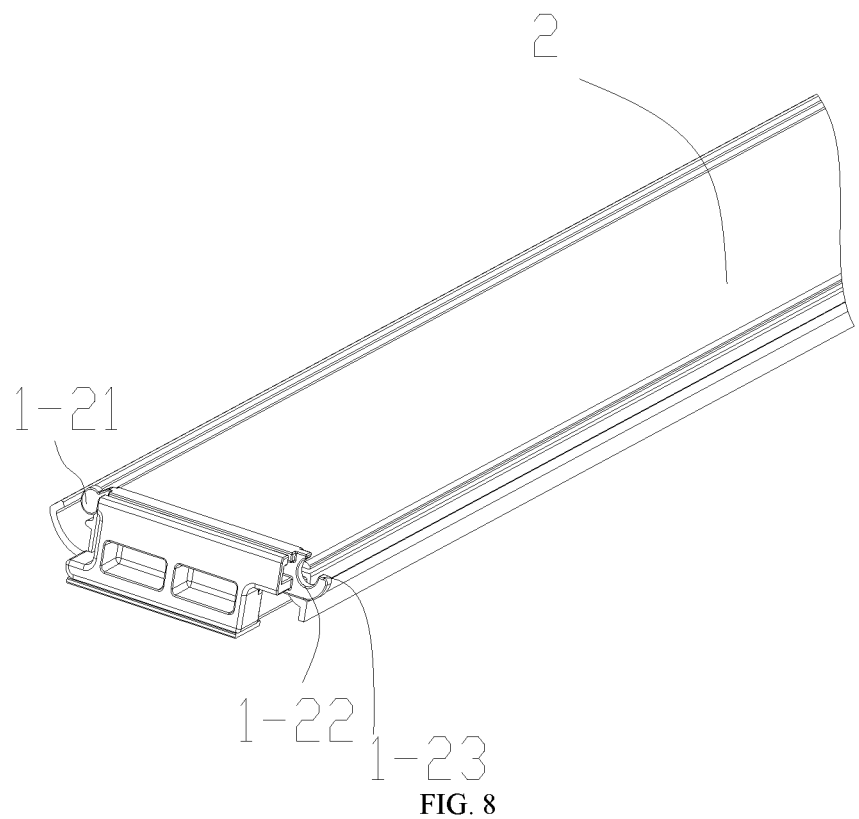
FIG. 8 is an assembly view of a cover plate, an end support part, and an upper slat unit according to Embodiment 2.
Figure 9:
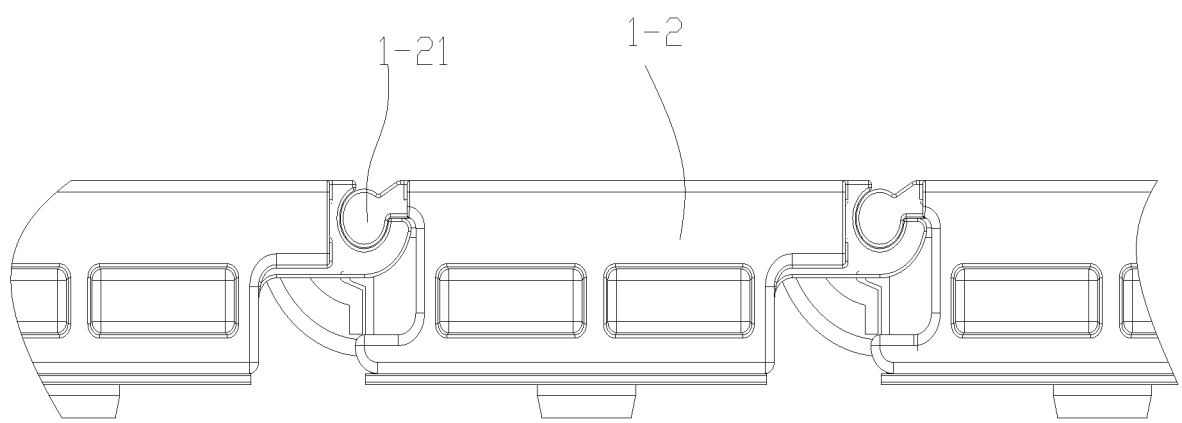
FIG. 9 is a connection view of adjacent end support parts.

As shown in FIGS. 7 to 9, this embodiment provides a rollaway top for a truck bed. The rollaway top includes a lower assembly. The lower assembly includes multiple lower slat units 1, soft layer 3, and end support parts 1-2.

The soft layer 3 continuously covers the lower assembly, and the soft layer 3 is connected to the lower assembly through a connector. The connector may be the upper slat unit 2 described in the above embodiment, or it may be a screw or rivet, etc.

Each of the end support parts 1-2 is integrated or fixedly connected to an end of the lower slat unit 1-1 or the connector, and each two adjacent end support parts 1-2 are rotatably connected.

The end support parts 1-2 each includes one end provided with rotating part 1-21 and the other end provided with open groove 1-22. The rotating part 1-21 of each of the end support parts 1-2 is provided in, and rotatable relative to the open groove 1-22 of an adjacent end support part 1-2. Specifically, the open groove 1-22 is provided with limit end 1-23. When the lower assembly is unrolled, the limit end 1-23 is abutted against the adjacent end support part 1-2 to limit a folding direction of the lower slat unit 1. In this way, when the rollaway top is rolled up, it can only be rolled upward. In addition, the end support part 1-2 further limits the rotation of the lower slat unit 1, so as to make the rotation of the lower slat unit 1 more stable.

Figure 10:
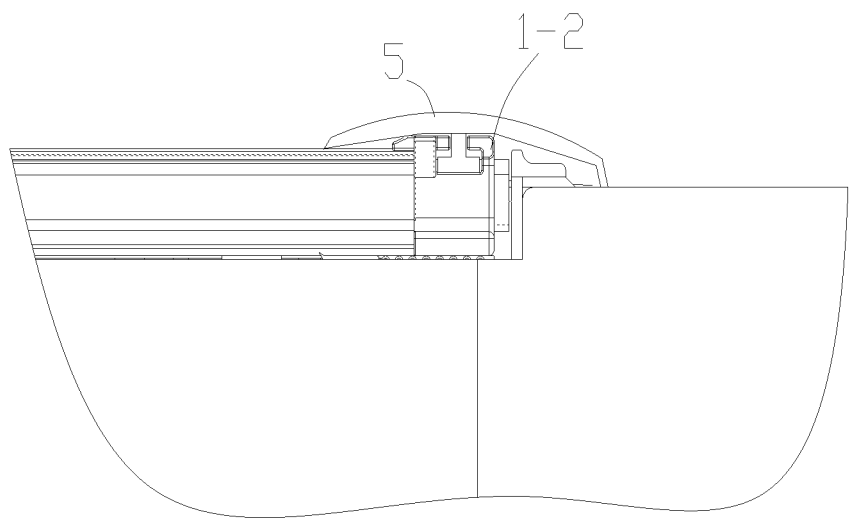
FIG. 10 is an assembly view of a waterproof cover strip according to Embodiment 2.

As shown in FIGS. 7 and 8, the end support part 1-2 is partially inserted into, and optionally fixed, for example, by bonding, with the recessed part 1-11 of cover plate 1-1. An upper edge of the end support part 1-2 extends to cover the cover plate 1-1 and the upper slat unit 2. In Embodiment 1, the clamp slot 2-2 for clamping the waterproof cover strip 5 is provided at the end support part 1-2. In this way, the waterproof cover strip 5 can be provided on the upper edge, as shown in FIG. 10.

In this embodiment, the end of the lower slat unit 1 or the upper slat unit 2 may or may not be provided with the limit assembly. If no limit assembly is provided, the rotational limit can be directly achieved through the end support part 1-2.

Embodiment 3

This embodiment includes the multi-layer hardtop structure described above. The truck bed is fixed with the side railing 4, and the lower assembly is supported on the side railing 4. A positioning mechanism is provided between the lower slat unit 1, the extension member at the end of the lower slat unit 1, or the extension member at the end of the upper slat unit 2 and the side railing 4. The extension member can be the end support part 1-2 or other end part in Embodiment 2. Preferably, as shown in FIG. 2, the positioning mechanism includes quick fastener 8 provided between the lower slat unit 1, the extension member at the end of the lower slat unit 1, or the extension member at the end of the upper slat unit 2 and the side railing 4. Of course, the positioning mechanism can also be in other forms. For example, the side railing 4 is provided with a recessed slot, and the lower slat unit 1, the extension member at the end of the lower slat unit 1, or the extension member at the end of the upper slat unit 2 is provided with a clamping post. The clamping post is provided with a clamping element. The recessed slot of the side railing is provided with a clamp slot matched with the clamping element along a left and/or right side wall of the truck bed. The clamping element is provided with wedge-shaped front and rear ends, such that the clamping element can be manually moved out of the clamp slot. Alternatively, the positioning mechanism is provided with a magnetic suction structure.

Embodiment 4

Figure 11:
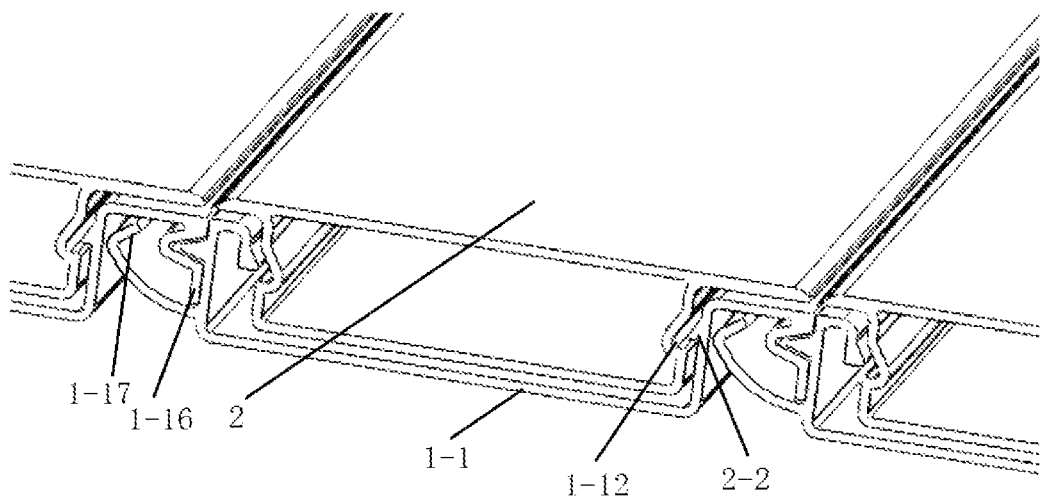
FIG. 11 is a schematic diagram of a cover plate and an upper slat unit that are matched with each other according to Embodiment 4.

In this embodiment, the structure of the lower slat unit 1 is shown in FIG. 11, and only the head of the first limit part 1-16 is provided with a curved plate for guidance. The other components of this embodiment are the same as those of Embodiment 2, and the rotation process can also be limited by the end support part 1-2. In addition, in this embodiment, the upper slat unit 2 is provided with a larger hole, allowing the end support part 1-2 to be inserted into the upper slat unit 2.

Embodiment 5

The end of the lower slat unit 1 is not provided with the limit assembly, and the limit assembly is provided in the upper slat unit 2. The end of the lower slat unit 1 or the upper slat unit 2 can be provided with the end support part 1-2 to achieve rotational limit, and the end support part 1-2 can also be omitted.

Embodiment 6

The ends of both the lower slat unit 1 and the upper slat unit 2 are not provided with the limit assembly. The end of the lower slat unit 1 or the upper slat unit 2 is provided with the end support part 1-2 to achieve rotational limit.

Embodiment 7

The ends of both the lower slat unit 1 and the upper slat unit 2 are not provided with the limit assembly. The ends of both the lower slat unit 1 and the upper slat unit 2 are not provided with the end support part 1-2. The connection is achieved through the soft layer 3, without angle limit.

The above merely describes specific implementations of the present invention, but the protection scope of the present invention is not limited thereto. Those skilled in the art can easily conceive modifications or replacements according to the technical solutions and ideas of the present invention within the technical scope of the present invention, and these modifications or replacements should fall within the protection scope of the present invention.

What is claimed is:

1. A multi-layer hardtop structure for a truck bed, comprising:
    a lower assembly comprising lower slat units;
    an upper assembly, comprising upper slat units, wherein the upper slat units are connected to the lower slat units; and
    a soft layer, continuously covering the lower assembly, and partially limited between the lower slat unit and the upper slat unit;
    wherein, one of the upper slat units is correspondingly connected to one of the lower slat units to form a rotation unit, or the lower slat unit alone forms a rotation unit; and two adjacent rotation units are rotatable relative to each other.

2. The multi-layer hardtop structure according to claim 1, wherein the upper slat unit is connected to the lower slat unit in one-to-one correspondence.

3. The multi-layer hardtop structure according to claim 1, wherein the upper slat unit is clamped to the lower slat unit.

4. The multi-layer hardtop structure according to claim 1, wherein the lower slat unit is provided with a recessed part, and the tipper slat unit is provided with a protruding part extending into the recessed part: the protruding part is provided with a clamp slot, and the recessed part is provided with a clamp buckle; and the clamp buckle and the clamp slot are separated by the soft layer, and are matched with each other.

5. The multi-layer hardtop structure according to claim 4, wherein the upper slat unit is provided with a top plate on at least one side of the recessed part, and the lower slat unit is provided with a support plate corresponding to the top plate; and when the clamp buckle and the clamp slot are matched, the soft layer is sandwiched between the top plate and the support plate.

6. The multi-layer hardtop structure according to claim 1, wherein a fastening element is provided between at least two of the lower slat unit, the soft layer, and the tipper slat unit.

7. The multi-layer hardtop structure according to claim 1, wherein each two adjacent lower slat units or each two adjacent upper slat units are connected through a limit assembly; the limit assembly comprises a first limit part and a second limit part; the first limit part is provided with a limit groove, and the second limit part is provided with a limit protrusion; when the lower slat units or the upper slat units are unrolled, the limit protrusion is inserted into the limit groove to prevent the two adjacent lower slat units or the two adjacent tipper slat units from moving up and down; and when two adjacent lower slat units or two adjacent upper slat units are rotated relative to each other for a set angle, the second limit part and the first limit part abut against each other to limit further relative rotation of the two adjacent lower slat units or the two adjacent upper slat units.

8. A cover assembly for a hard top of a truck bed, comprising the multi-layer hardtop structure according to claim 1, and further comprising a side railing, wherein the side railing is fixed to the truck bed through a fixture; the side railing is provided with a drain channel; the side railing is further provided with drain holes located above the drain channel and communicated with the drain channel; the side railing is further provided with a lock structure matched with the lower assembly; and the lock structure is matched with an end of the lower assembly close to a rear part of the truck bed.

9. The cover assembly according to claim 8, wherein the upper slat unit is connected to the lower slat unit in one-to-one correspondence.

10. The cover assembly according to claim 8, wherein the upper slat unit is clamped to the lower slat unit.

11. The cover assembly according to claim 8, wherein the lower slat unit is provided with a recessed part, and the upper slat unit is provided with a protruding part extending into the recessed part; the protruding part is provided with a clamp slot, and the recessed part is provided with a clamp buckle; and the clamp buckle and the clamp slot are separated by the soft layer, and are matched with each other.

12. The cover assembly according to claim 11, wherein the upper slat unit is provided with a top plate on at least one side of the recessed part, and the lower slat unit is provided with a support plate corresponding to the top plate; and when the clamp buckle and the clamp slot are matched, the soft layer is sandwiched between the top plate and the support plate.

13. The cover assembly according to claim 8, wherein a fastening element is provided between at least two of the lower slat unit, the soft layer, and the upper slat unit.

14. The cover assembly according to claim 8, wherein each two adjacent lower slat units or each two adjacent upper slat units are connected through a limit assembly; the limit assembly comprises a first limit part and a second limit part; the first limit part is provided with a limit groove, and the second limit part is provided with a limit protrusion; when the lower slat units or the upper slat units are unrolled, the limit protrusion is inserted into the limit groove to prevent the two adjacent lower slat units or the two upper slat units from moving up and down; and when two adjacent lower slat units or two adjacent upper slat units are rotated relative to each other for a set angle, the second limit part and the first limit part abut against each other to limit further relative rotation of the two adjacent lower slat units or the two adjacent upper slat units.

15. An end support mechanism for a rollaway top of a truck bed, comprising:
    a lower assembly, comprising lower slat units;
    a soft layer, continuously covering the lower assembly, and connected to the lower assembly through a connector; and end support parts, wherein each of the end support parts is integrated or fixedly connected to an end of the lower slat unit or an end of the connector, and two adjacent end support parts are rotatably connected.

16. The end support mechanism for a rollaway top of a truck bed according to claim 15, wherein each of the end support parts comprises a first end provided with a rotating part and a second end provided with an open groove; and the rotating part of each of the end support parts is provided in the open groove of an adjacent end support part, and the rotating part is rotatable relative to the open groove.

17. The end support mechanism for a rollaway top of a truck bed according to claim 16, wherein the open groove is provided with a limit end; and when the lower assembly is unrolled, the limit end abuts against the adjacent end support part to limit a folding direction of the lower slat unit.

* * * * *